US012120014B1

(12) United States Patent
Mason et al.

(10) Patent No.: US 12,120,014 B1
(45) Date of Patent: Oct. 15, 2024

(54) INTERNAL BGP MIGRATION OPTIMIZATION

(71) Applicant: DISNEY ENTERPRISES, INC., Burbank, CA (US)

(72) Inventors: Andrew W. Mason, Windermere, FL (US); Thomas Gregory Dowers, DeBary, FL (US); Mark G. Cloud, Clermont, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 18/455,354

(22) Filed: Aug. 24, 2023

(51) Int. Cl.
```
G06F 13/00      (2006.01)
H04L 45/02      (2022.01)
H04L 45/12      (2022.01)
H04L 45/44      (2022.01)
```
(52) U.S. Cl.
CPC ............ H04L 45/02 (2013.01); H04L 45/123 (2013.01); H04L 45/44 (2013.01)

(58) Field of Classification Search
CPC ........ H04L 45/02; H04L 45/123; H04L 45/44
USPC ................... 709/238, 239, 245, 224
See application file for complete search history.

(56) References Cited

U.S. PATENT DOCUMENTS

| | | | |
|---|---|---|---|
| 7,894,462 B2 * | 2/2011 | Uttaro | H04L 45/04 370/402 |
| 11,296,973 B2 * | 4/2022 | Toyozumi | H04L 12/4641 |
| 2006/0083215 A1 * | 4/2006 | Uttaro | H04L 45/033 370/351 |
| 2010/0166001 A1 * | 7/2010 | Uttaro | H04L 45/02 370/401 |
| 2021/0006485 A1 * | 1/2021 | Toyozumi | H04L 12/4633 |
| 2023/0370358 A1 * | 11/2023 | Song | H04L 12/4641 |

OTHER PUBLICATIONS

RRLOC: A Tool for iBGP Route Reflector Topology Planning and Experimentation; Emiliano Gutierrez et al.; IEEE Network Operations and Management Symposium; pp. 1-4 (Year: 2014).*

* cited by examiner

*Primary Examiner* — Kenneth R Coulter
(74) *Attorney, Agent, or Firm* — Squire Patton Boggs LLP; Sarah Mirza

(57) ABSTRACT

One embodiment of a method for migrating a multi-region network including multiple autonomous systems into a single autonomous system comprises allocating a unique identifier to each autonomous system of a plurality of autonomous systems, wherein each autonomous system includes a corresponding regional route reflector; tagging the routing instruction advertised to a global route reflector by a regional route reflector included in one of the plurality of autonomous systems with the unique identifier of the autonomous system corresponding to the regional route reflector that advertised the routing instruction; instructing the regional route reflectors included in the plurality of autonomous systems to ignore routing instructions received from the global route reflector that are tagged with one of the unique identifiers allocated to the plurality of autonomous systems; and migrating one autonomous system of the plurality of autonomous systems by: removing the unique identifier from routing instructions advertised to the global route reflector from the regional route reflector; and instructing the regional route reflector to apply routing instructions received from the global route reflector that are tagged with the unique identifier.

20 Claims, 10 Drawing Sheets

701 {
```
! RRR1                                                          ⎤— 701-2
! BGP community value for local region 65010:9901               ⎦— 701-4

! BGP community regular expression to match all regions
community-set MIGRATION-PROJECT-REMOTE-PFX-COMM
   ios-regex '(65010:99)[0-9][0-9]'                             ⎫— 701-6
end-set ! BGP routing policy outbound to hierarchical route reflectors
route-policy IPV4-RRR-TO-GRR-OUT                                ⎫— 701-8
   set community MIGRATION-PROJECT-LOCAL-PFX-COMM additive
end-policy ! BGP routing policy inbound from hierarchical route reflectors
route-policy IPV4-RRR-TO-GRR-IN
   if community matches-any MIGRATION-PROJECT-REMOTE-PFX-COMM then
drop else
pass endif
end-policy
community-set MIGRATION-PROJECT-LOCAL-PFX-COMM                  ⎫— 701-10
   65010:9901
end-set
router bgp 65001
neighbor IBGP-IPV4-GRR route-map IPV4-RRR-TO-GRR-IN in
neighbor IBGP-IPV4-GRR route-map IPV4-RRR-TO-GRR-OUT out
exit
exit
wr me
```

702 {
```
! RRR2
! BGP community value for local region 65010:9902 community-set MIGRATION-PROJECT-LOCAL-PFX-COMM
   65010:9902
end-set

! BGP community regular expression to match all regions
community-set MIGRATION-PROJECT-REMOTE-PFX-COMM
   ios-regex '(65010:99)[0-9][0-9]'
end-set ! BGP routing policy outbound to hierarchical route reflectors
route-policy IPV4-RRR-TO-GRR-OUT
   set community MIGRATION-PROJECT-LOCAL-PFX-COMM additive
end-policy ! BGP routing policy inbound from hierarchical route reflectors
route-policy IPV4-RRR-TO-GRR-IN
   if community matches-any MIGRATION-PROJECT-REMOTE-PFX-COMM then
drop else
pass endif
end-policy
router bgp 65002
neighbor IBGP-IPV4-GRR route-map IPV4-RRR-TO-GRR-IN in
neighbor IBGP-IPV4-GRR route-map IPV4-RRR-TO-GRR-OUT out
exit
exit
wr me
```

FIG. 7A

703 {
```
! RRR3
! BGP community value for local region 65010:9903

! BGP community regular expression to match all regions
community-set MIGRATION-PROJECT-REMOTE-PFX-COMM
  ios-regex '(65010:99)[0-9][0-9]'
end-set ! BGP routing policy outbound to hierarchical route reflectors
route-policy IPV4-RRR-TO-GRR-OUT
  set community MIGRATION-PROJECT-LOCAL-PFX-COMM additive
end-policy ! BGP routing policy inbound from hierarchical route reflectors
route-policy IPV4-RRR-TO-GRR-IN
  if community matches-any MIGRATION-PROJECT-REMOTE-PFX-COMM then
drop else
pass endif
end-policy
community-set MIGRATION-PROJECT-LOCAL-PFX-COMM
  65010:9903
end-set
router bgp 65003
neighbor IBGP-IPV4-GRR route-map IPV4-RRR-TO-GRR-IN in
neighbor IBGP-IPV4-GRR route-map IPV4-RRR-TO-GRR-OUT out
exit
exit
wr me
```

704 {
```
! RRR4
! BGP community value for local region 65010:9904

! BGP community regular expression to match all regions
community-set MIGRATION-PROJECT-REMOTE-PFX-COMM
  ios-regex '(65010:99)[0-9][0-9]'
end-set ! BGP routing policy outbound to hierarchical route reflectors
route-policy IPV4-RRR-TO-GRR-OUT
  set community MIGRATION-PROJECT-LOCAL-PFX-COMM additive
end-policy ! BGP routing policy inbound from hierarchical route reflectors
route-policy IPV4-RRR-TO-GRR-IN
  if community matches-any MIGRATION-PROJECT-REMOTE-PFX-COMM then
drop else
pass endif
end-policy
community-set MIGRATION-PROJECT-LOCAL-PFX-COMM
  65010:9904
end-set
router bgp 65004
neighbor IBGP-IPV4-GRR route-map IPV4-RRR-TO-GRR-IN in
neighbor IBGP-IPV4-GRR route-map IPV4-RRR-TO-GRR-OUT out
exit
exit
wr me
```

FIG. 7B

```
! RRR5
! BGP community value for local region 65010:9905

! BGP community regular expression to match all regions
community-set MIGRATION-PROJECT-REMOTE-PFX-COMM
  ios-regex '(65010:99)[0-9][0-9]'
end-set ! BGP routing policy outbound to hierarchical route reflectors
route-policy IPV4-RRR-TO-GRR-OUT
  set community MIGRATION-PROJECT-LOCAL-PFX-COMM additive
end-policy ! BGP routing policy inbound from hierarchical route reflectors
route-policy IPV4-RRR-TO-GRR-IN
  if community matches-any MIGRATION-PROJECT-REMOTE-PFX-COMM then
drop else
pass endif
end-policy
community-set MIGRATION-PROJECT-LOCAL-PFX-COMM
  65010:9905
end-set
router bgp 65005
neighbor IBGP-IPV4-GRR route-map IPV4-RRR-TO-GRR-IN in
neighbor IBGP-IPV4-GRR route-map IPV4-RRR-TO-GRR-OUT out
exit
exit
wr me
```

INTERNAL BGP MIGRATION OPTIMIZATION

BACKGROUND

Field of the Various Embodiments

Embodiments of the present disclosure relate generally to techniques for migrating a network including multiple autonomous routing systems using External Border Gateway Protocol (eBGP) into a single autonomous routing system using Internal Border Gateway Protocol (iBGP).

Description of the Related Art

The design of a large multi-region network is rarely static in nature. New developments in technology, changes in employee location dispersion and concentration, and shifts in operating requirements around security and reliability can all necessitate changes in the design of a network. Migrating between an existing network design and a new network design can be complicated by the size and complexity of the network and the risk of work disruption should network outages occur due to the migration.

In modern network design, network communications typically take advantage of the Internet to carry network traffic from one location in a multi-region network to another disparate location. For example, a large corporation can have multiple office locations dispersed over multiple geographies. Each geography can have its own network, representing one of the hundreds of thousands of networks making up the Internet. Each network is termed an autonomous system (AS). Each autonomous system is essentially a large pool of routers. A single organization or company can have one or more (and often many) autonomous systems.

In this scenario, where the Internet is used to carry network traffic from one location in a multi-region network to another, the routing both within an autonomous system and between autonomous systems is handled by a standard called Border Gateway Protocol (BGP). Border Gateway Protocol is the routing protocol for the Internet. Much like the post office processing mail, BGP picks the most efficient routes for delivering Internet traffic. Routing in BGP can take different forms including External Border Gateway Protocol (eBGP) and Internal Border Gateway Protocol (IBGP). The primary difference between eBGP and iBGP is that eBGP is used to communicate between autonomous systems and iBGP is used to communicate between routers within the same autonomous system. When initially constructing a network for an organization with distributed office locations and where new offices are added piecemeal over time, it can be advantageous to design the network such that each locale is treated as a separate autonomous system. When a new location is added, such as through corporate acquisition or the addition of satellite offices, the organization simply adds a new autonomous system that is responsible for the routing of all network traffic within the new location.

Over time however, using multiple autonomous systems within a single organization can lead to complications because network routes are treated differently when they are advertised with the other outside domains (controlled by other autonomous systems within the organization) than when they are learned within an individual domain. In addition, because eBGP operates on a partial mesh network, some nodes within the internal network may be in fact be unreachable. As such, it may become desirable to migrate to a new network design where all of the individual autonomous systems connected together in the multi-region network using eBGP are merged into a single autonomous system using iBGP for internal routing.

One problem with migrating the multiple autonomous systems into a single autonomous system is that the iBGP topology information must not affect the operation of non-migrated areas of the network. Overlapping topology information can result in suboptimal routing and in some cases, unreachable applications. There is also a need to make minimal concurrent changes as regions can span multiple time zones and/or change jurisdictions and are often migrated over a period of several months.

As the foregoing illustrates, what is needed are techniques for migrating from multiple autonomous systems connected using eBGP to a single autonomous system using iBGP.

SUMMARY

One embodiment of a method for migrating a multi-region network including multiple autonomous systems into a single autonomous system. The method includes allocating a unique identifier to each autonomous system of a plurality of autonomous systems, wherein each autonomous system includes a corresponding regional route reflector. The method further includes tagging the routing instruction advertised to a global route reflector by a regional route reflector included in one of the plurality of autonomous systems with the unique identifier of the autonomous system corresponding to the regional route reflector that advertised the routing instruction. The method also includes instructing the regional route reflectors included in the plurality of autonomous systems to ignore routing instructions received from the global route reflector that are tagged with one of the unique identifiers allocated to the plurality of autonomous systems. In addition, the method includes migrating one autonomous system of the plurality of autonomous systems by: removing the unique identifier from routing instructions advertised to the global route reflector from the regional route reflector; and instructing the regional route reflector to apply routing instructions received from the global route reflector that are tagged with the unique identifier.

At least one technical advantage of the disclosed techniques relative to the prior art is that the disclosed techniques provide a mechanism to safely migrate multiple autonomous systems using eBGP into a single autonomous system using iBGP. The disclosed techniques ensure that during migration all currently routed paths remain optimal and unchanged after migration. The disclosed techniques also ensure that no routing loops form as the migration progresses from site to site. The disclosed techniques further ensure that all site networks and resources remain reachable as the migration progresses from site to site. Finally, the disclosed mechanism offers a time window for the administrator to use tools to verify that all sites will retain access to the network resources belonging to the site targeted for migration before the migration of the targeted site begins. The technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 7A is an exemplary first part of a configuration file for configuring a regional route reflector for migration, according to one or more embodiments;

FIG. 7B is an exemplary second part of a configuration file for configuring a regional route reflector for migration, according to one or more embodiments;

FIG. 7C is an exemplary third part of a configuration file for configuring a regional route reflector for migration, according to one or more embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
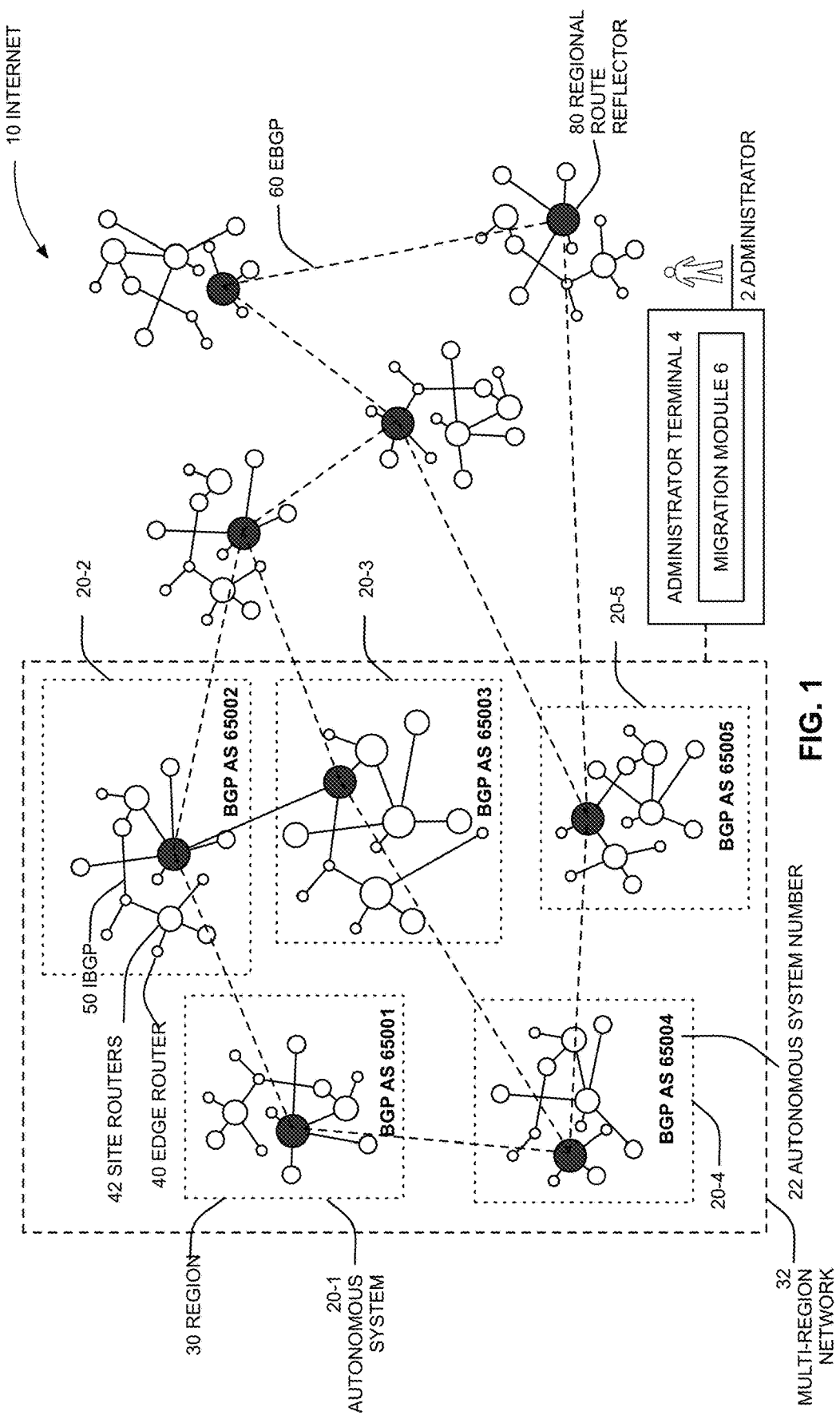
FIG. 1 is a conceptual illustration of the Internet as a network of networks, where each network connects to the Internet as an autonomous system, according to one or more embodiments.

FIG. 1 is a conceptual illustration of the Internet 10 as a network of networks, where each network connects to the Internet as an autonomous system 20, according to one or more embodiments. The Internal BGP Migration Optimization Technique (IBGPMO) described herein is designed for migrating a multi-region network 32 including multiple autonomous systems 20[1:5] into a single autonomous system 20. An exemplary multi-region network 32 connected to the Internet using BGP routing is shown in FIG. 1.

As used herein, an autonomous system 20 is a collection of IP networks operated by a single organization or entity that follows a common routing policy. Autonomous systems 20 are identified by unique numbers called autonomous system numbers (ASNs) 22. Autonomous systems 20 facilitate the routing of network traffic on the Internet 10. Each autonomous system 20 manages and controls the routing within its own region 30. This partitioning of responsibilities allows network administrators to maintain control over the flow of traffic, apply specific routing policies, and exchange routing information with other autonomous systems 20 to ensure efficient and reliable communication across the network.

Autonomous systems 20 are often allocated by network region 30. However, the described techniques are not limited hereto. As described herein, an autonomous system 20 can cover more than one region 30, and a region 30 can have more than one autonomous system 20. As used herein, a network region (or simply region or site) 30 refers to a geographical or logical area within a larger network that is delineated based on various factors, such as physical proximity, administrative boundaries, or specific operational requirements. The network region 30 represents a subset of the overall network infrastructure that can be managed and operated as a distinct entity. In terms of geographical regions, a network region 30 could represent a specific geographic area, such as a country, city, or campus, where network resources and services are deployed and interconnected. For example, a company with offices in different cities may have network regions 30 corresponding to each city, with localized networking infrastructure serving the needs of that particular region 30. In addition to geographical boundaries, network regions 30 can also be defined based on logical or administrative considerations. For instance, in a large-scale enterprise network, different divisions or departments may be assigned their own network regions 30 to ensure separation and autonomy in terms of network management and resource allocation. Network regions 30 are often associated with specific network policies, security settings, and resource management practices. Network regions 30 allow for localized control and optimization of network operations within a defined area, while still maintaining connectivity and interoperability with other regions within the broader network. The presence network regions 30 helps organizations structure and organize their network infrastructure in a scalable and manageable manner. This partitioning enables efficient resource allocation, localized administration, and targeted implementation of network services and policies based on the unique requirements of each region 30. In some cases, such as in FIG. 1, there is a one-to-one correspondence between regions 30 and autonomous systems 20. A network that spans multiple regions is referred to as a multi-region network 32. Network regions (or simply regions) can also be referred to as sites.

The traffic that flows between the individual networks of the Internet 10 is handled by BGP. BGP is the primary routing protocol used to exchange routing information and facilitate the routing decisions made by routers in different autonomous systems 20 on the Internet 10. BGP is responsible for determining the best routing paths for forwarding network traffic between different autonomous systems 20. BGP operates at the Internet's core, enabling communication between various networks and ensuring efficient and reliable routing across the global network. BGP employs a path-vector protocol that takes into account multiple factors, such as network policies, path attributes, and performance metrics, to make informed routing decisions. The main purpose of BGP is to exchange information about network reachability and associated attributes between routers in different autonomous systems 20. The network reachability and associated attributes include things like the autonomous system 20 path, indicating the path the routing update has traversed through autonomous systems 20, and other metrics used to determine the best path for reaching a particular destination. BGP routers exchange routing updates and perform route advertisements and withdrawals to notify neighboring routers of changes in network reachability. The routing updating process allows routers to dynamically adjust their routing tables and update forwarding decisions based on the most up-to-date information. Examples of BGP routers include regional route reflectors 80 as well as router (also referred to as a regional route reflector client). BGP comes in two forms: eBGP 60 and iBGP 50.

iBGP 50 allows routers within the same autonomous system 20 to share information about the best paths to reach destinations outside the autonomous system 20. iBGP 50 helps in maintaining consistent and accurate routing information throughout the network, ensuring that all routers within the autonomous system 20 have a consistent view of the external network. When a router within an autonomous system 20 receives routing updates from an external autonomous system 20 via eBGP 60, the router can use iBGP 50 to distribute those updates to other routers within the same autonomous system 20. This way, all routers in the autonomous system 20 can make informed forwarding decisions based on the most up-to-date routing information. iBGP 50 relies on a full-mesh or a route reflector topology to ensure that routing updates are efficiently propagated within the autonomous system 20. In a full-mesh setup, each router establishes a direct iBGP 50 connection with every other router in the autonomous system 20. In a route reflector setup, certain routers are designated as route reflectors that reflect routing updates to other routers, reducing the number of iBGP 50 connections required.

eBGP 60 is the routing protocol used to exchange routing information between different autonomous systems 20 on the Internet 10. Unlike iBGP 50, which is used for internal routing within an autonomous system 20, eBGP 60 is used for routing between different autonomous systems 20. When two autonomous systems 20 connect and want to exchange routing information, they typically establish eBGP 60 peering sessions between their border routers. These peering sessions allow the exchange of routing updates and help determine the best paths for reaching destinations in other autonomous systems 20. eBGP 60 is responsible for exchanging reachability information, including network prefixes and associated attributes, between autonomous systems 20. eBGP 60 advertises the paths available to reach destinations in one autonomous system 20 to neighboring autonomous systems 20, which in turn propagates the information further. One key feature of eBGP 60 is its loop-prevention mechanism. eBGP 60 prevents routing information from circulating endlessly between autonomous systems 20 by comparing the autonomous system 20 numbers of received updates with its own autonomous system number 22. If an update contains the originating autonomous system number 22, the update is not accepted in order to prevent routing loops. By using eBGP 60, different autonomous systems 20 can effectively communicate and route traffic across the Internet 10. eBGP 60 helps establish connectivity between networks operated by different organizations or service providers.

There are two loop prevention mechanisms generally employed when architecting and designing BGP autonomous system 20 routing domains. A first loop prevention mechanism is to prevent control plane or data plane routing loops in an iBGP domain. Planes are references to types of decisions routers make to forward either control plane information, the BGP table of networks and attributes, or data plane information relating to the customer application data flows over the network. A third plane is the management plane on the router used in sending log information, notifications regarding interface status, memory and CPU information, and configuration management information. The IBGPMO technique described herein deals primarily with the control plane and how it influences data plane forwarding decisions and how to consistently protect and ensure proper router data plane forwarding decisions.

Another loop prevention mechanism effecting the policy is that if a BGP router learns routes from another iBGP peer, the BGP router will not re-advertise those routes. If not prevented, the BGP router could be sending the same route advertisement to another peer that already knows about the route. Resending this known information results in a waste of processing on the router and can result in a control plane loop as all the iBGP peers re-advertise the same information to each other. If all the peers are directly connected, then putting the network or route next hop as the connector learned from the other peer without using an underlying IGP protocol (that can peer the routers using the loopback interfaces) can cause routing loops or poor application data flow path selection to occur. IGP (Interior Gateway Protocol) is a type of routing protocol used within an autonomous system 20 to exchange routing information between routers. Typically, iBGP autonomous system 20 domains have an IGP that is scoped to the edge of the BGP domain to advertise all the BGP router loopback interfaces and connectors. This IGP enables the BGP peers to form TCP connections on TCP port 179 between all the routers to exchange BGP table routing attributes and network information.

A router is a networking device that connects multiple computer networks together and forwards data packets between the networks. It operates at the network layer (Layer 3) of the OSI model and makes intelligent routing decisions based on the destination IP addresses of the packets it receives. There are several different types of routers in FIG. 1. The routers at the tips of the autonomous systems 20 are referred to as customer-connected edge routers 40. The customer connected edge routers 40 peer as regional route reflector clients up to site routers 42. The site routers 42 peer as regional route reflector clients up to regional route reflector 80. The IBGPMO migration technique introduces the use of a global router reflector (another type of router), which is not shown in FIG. 1. Generally, the customer-connected edge routers 40, site routers 42, regional route reflector 80, and global router reflector are collectively referred to as routers. In many production environments, the routers will be deployed in pairs (two routers for a given role). This architecture provides redundancy and mitigation for a single point of failure.

A route reflector is a networking device or feature used in BGP networks to simplify the exchange of routing information between routers. In a BGP network, routers typically exchange routing updates with their directly connected neighbors. However, in large-scale networks, the full-mesh connectivity required for direct neighbor exchanges can be complex and resource-intensive. A route reflector acts as a central point for route propagation, allowing routers within a cluster to exchange routing information with the route reflector instead of establishing direct peering relationships with every other router. The route reflector receives BGP updates from its clients, which are typically other routers within the same cluster, and then reflects these updates to other clients. By using a route reflector, the need for a full mesh of connections is eliminated, simplifying the network topology and reducing the number of BGP peering sessions required. This can improve scalability and reduce the computational and memory resources needed on individual routers. Route reflectors play a crucial role in large BGP networks, enabling efficient routing information distribution while reducing the complexity of inter-router connections.

Regional route reflectors 80 are a class of route reflectors where the clients of the route reflectors are the routers within the same autonomous system 20. The regional route reflectors 80 receive BGP updates from the other routers within the same autonomous system 20 and reflect the updates to other regional route reflectors 80. Some of those other regional route reflectors 80 can be in the same multi-region network 32, while others are outside the multi-region network 32. In summary, a regional route reflector is a route reflector deployed at a specific geographical region within a larger network, serving as a local hub for BGP peering and route reflection within that region.

BGP peering, also known as a BGP session or a BGP neighbor relationship, refers to the connection established between two routers running BGP. BGP peering allows these routers to exchange routing information and maintain synchronized routing tables. BGP peering is essential for routers to communicate and exchange routing updates within an autonomous system 20 or between different autonomous systems 20 on the Internet 10. Peering connections are typically established between neighboring routers that are directly connected or connected via a network infrastructure. To establish a BGP peering, routers must agree on common configuration parameters such as the IP addresses used for communication, the BGP version, and authentication settings if enabled. Once the peering is established, routers exchange routing updates, advertise network prefixes, and exchange information about the best paths to reach different destinations. BGP peering can be established in two main forms: eBGP 60 peering which involves establishing BGP peering sessions between routers in different autonomous systems 20, enabling routing between the autonomous systems 20, and iBGP 50 peering which involves establishing BGP peering sessions between routers within the same autonomous system 20, facilitating routing within the autonomous system 20. BGP peering connections play a crucial role in determining how network traffic is routed across the Internet. By exchanging routing information, routers make informed decisions about the best paths for forwarding packets based on the advertised routes and associated attributes.

The steps to implement the IBGPMO technique are performed by the migration module 6 on the administrator terminal 4 based on inputs received from an administrator 2. The administrator terminal 4 can take the form of a desktop computer, laptop, server, tablet, smartphone, or any device capable of performing the required functions. The administrator terminal 4 is operable to reach all of the autonomous systems 20 included in the multi-region network 32. The operation of the migration module 6 can be programmatic, scripted, interactive based on administrator 2 input, or any combination thereof.

Figure 2:
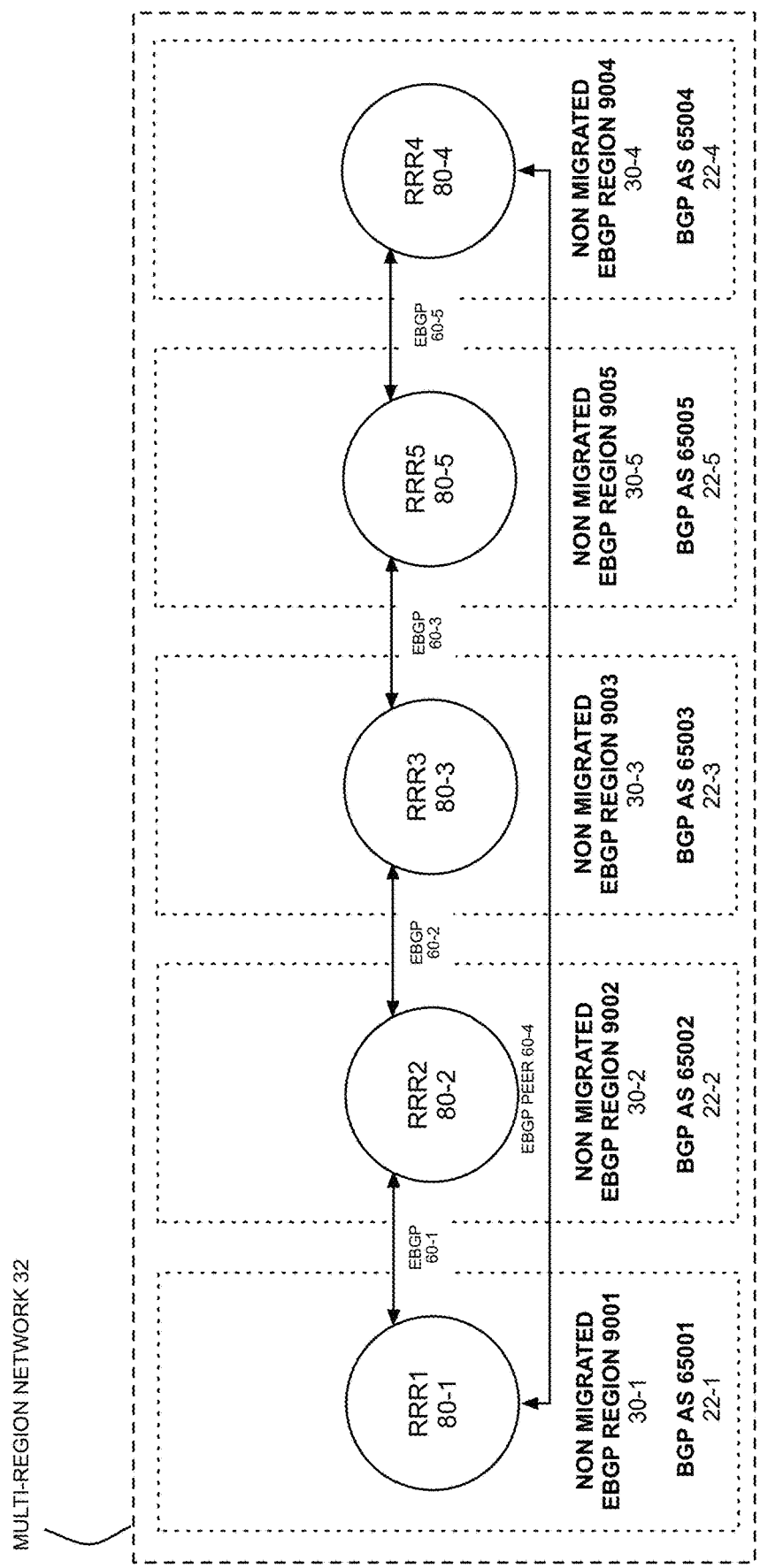
FIG. 2 is a conceptual illustration of an exemplary multi-region network including multiple autonomous systems connected using eBGP prior to migration to a single autonomous system using iBGP, according to one or more embodiments.

FIG. 2 is a conceptual illustration of an exemplary multi-region network including multiple autonomous systems connected using eBGP prior to migration to a single autonomous system using iBGP, according to one or more embodiments. The elements of FIG. 2 are taken from the multi-region network 32 portion of FIG. 1. The exemplary multi-region network 32 is comprised of five autonomous systems 20:[1-5] (65001, 65002, 65003, 65004, 65005) corresponding to five regions 30:[1-5] (9501, 9502, 9503, 9504, 9505) connected using eBGP 60:[1-5] peerings. The regional route reflectors 80:[1-5] for each autonomous system 20 is shown, the rest of the routers (and various other computing resources such as laptops, tablets, printers, servers, etc on the network) are not. eBGP 60:[1-5] peerings do not form a complete mesh, as a full mesh is not required for eBGP. At least one of the regional route reflectors 80:[1-5] of the multi-region network 32 is connected via an eBGP 60 peering to a regional route reflector 80 outside the multi-region network 32 to facilitate Internet 10 connectivity.

Figure 3:
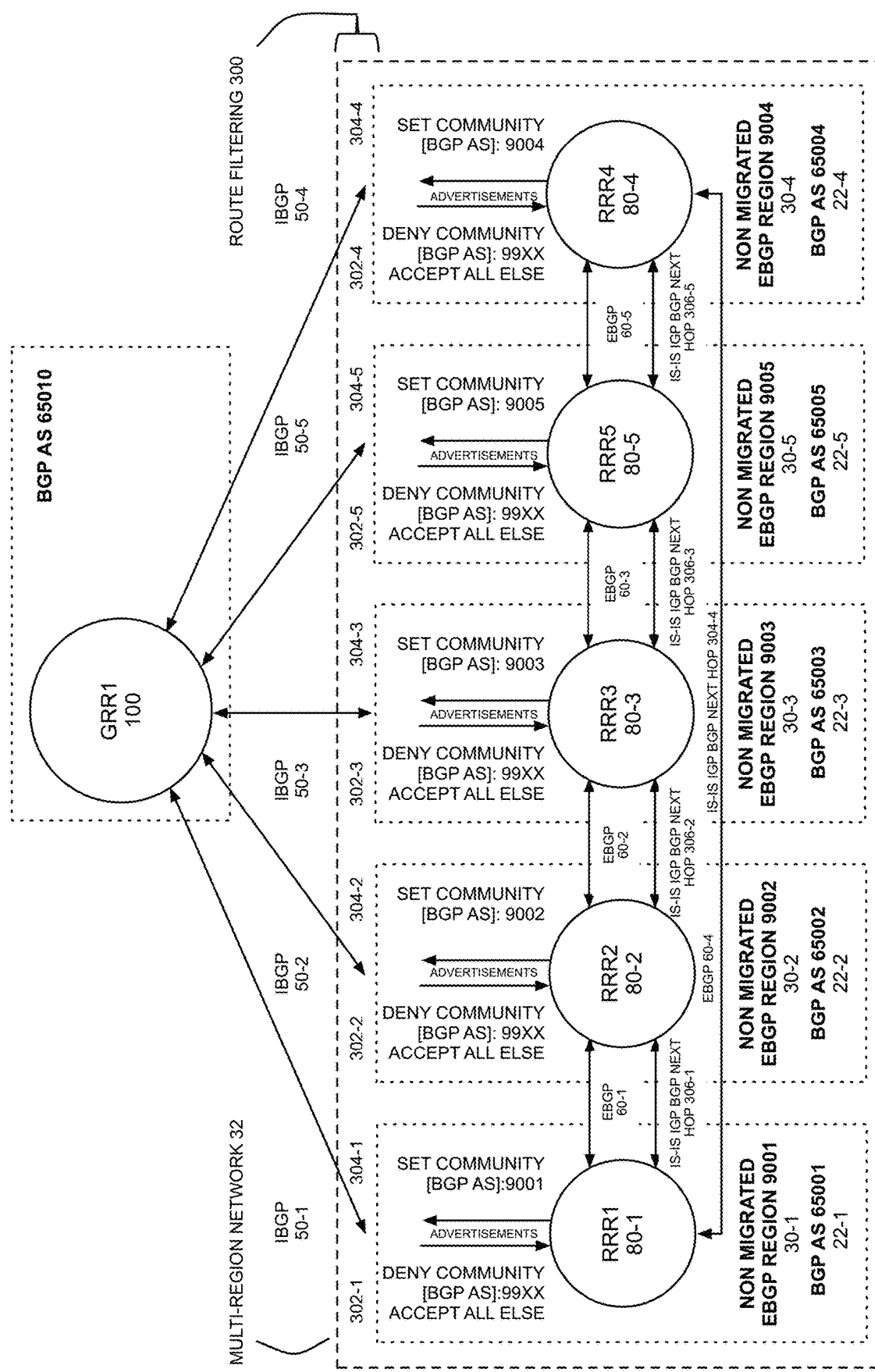
FIG. 3 is a conceptual illustration of the exemplary multi-region network including multiple autonomous systems connected using eBGP of FIG. 2 where iBGP topology infrastructure has been added in preparation for migration to the single autonomous system using iBGP, according to one or more embodiments.

FIG. 3 is a conceptual illustration of the exemplary multi-region network including multiple autonomous systems connected using eBGP of FIG. 2 where iBGP topology infrastructure has been added in preparation for migration to the single autonomous system using iBGP, according to one or more embodiments. The added iBGP topology infrastructure elements includes a global route reflector 100, iBGP 50:[1-5] peerings, next hop instructions 306 and community tag filtering 300 (including inbound route filtering 302 based on tagging and outbound route advertisement tagging 304).

For the iBGPMO technique described, the multi-region network 32 begins as a single IGP domain with Multiple BGP domains within that scoped IGP domain architected and designed by one architecture team managed by one support team. The technique permits the protection of the routed data plane application flows over the multi-region network 32, preventing any current routed paths from changing and selecting a less optimal routed path. It also can eliminate potential routing loops. This also allows the ability to review the BGP tables to ensure all regional route reflectors 80 have all the routes or networks they learn from the new iBGP global route reflectors 100 are still in the route table before removing any eBGP peers, which could cause a network reachability outage to some applications. eBGP learned routes and iBGP learned routes can be compared before removing the eBGP peers.

One difference in the iBGP learned routes from the global route reflector 100 and the eBGP routes learned from the directly connected eBGP peers is the autonomous system 20 path length, where the iBGP routes is less than the eBGP learned routes. As a result, since the BGP Attribute AS-Path Length check is before the routing metric comparison, a less optimal routing path could occur.

In preparation for applying the IBGPMO technique, the non-migrated regions 30 of the multi-region network 32 are connected to form the full mesh as required by iBGP. To reduce the number of actual connections, the iBGP peering is accomplished using a global route reflector 100.

A global route reflector 100 is another class of route reflector. When using iBGP, a full mesh of connections is required between all participating regional route reflectors 80. When the number of participating routers becomes high, the number of connections required becomes prohibitively high (connections required are N(N-1)/2). The use of a global route reflector 100 allows the complexity of the regional route reflectors 80 to be reduced since only the global route reflector 100 needs to store all connections within the autonomous system 20. However, acting as a single storage point means that the global route reflector 100 becomes a single point of failure. The single storage point can be overcome by introducing redundancy at the global route reflector 100 level. The single point of failure issue applies to all routers and can be similarly overcome by introducing redundancy for each router.

IBGP 50 peering is accomplished using the BGP local-as configuration option. BGP local-as is a configuration option within BGP that allows a router to advertise routes with a different autonomous system number 22 than its own. The BGP local-as configuration is primarily used in scenarios, where a router is connected to an ISP or a peer that requires a specific autonomous system number 22 to be advertised for routing purposes. When a router is configured with the local-as option, the router instructs BGP to advertise routes with the specified local autonomous system number 22 instead of its own autonomous system number 22. This can be useful in situations where a network is transitioning between autonomous system numbers 22 or when there is a need to present a specific autonomous system number 22 to the external network.

The local-as configuration typically applies to the outbound BGP advertisements, allowing the router to modify the autonomous system number 22 in the updates it sends to its peers. It does not change the actual autonomous system number 22 used internally within the network. The use of BGP local-as requires consideration of the network's routing policies and agreements with upstream providers or peers. Proper coordination and communication with relevant parties are essential to ensure consistent and accurate routing information across the network and the broader Internet.

Each of the non-migrated network regions 30 is assigned a next-hop instruction 306 to identify preferred routing paths among the regions 30. The next hop instructions 306, more formally known as the IS-IS IGP BGP NEXT HOP attribute is a well-known mandatory attribute that defines the IP address of the router that should be used as the next hop to the destinations listed in an update message. The next hop instructions 306 forces the router to do a recursive lookup in order to determine which egress interface should be used to send the packets out.

Once the global route reflector 100 and the iBGP 50:[1-5] peerings are in place, the regional route reflectors 80:[1-5] add a community tag 304 identifying the autonomous system 20 from which the community tag originates. For example, regional route reflector 80-1 tags the routing paths 302-1 sent to the global route reflector 100 with the tag "[BG AS]:65001" indicating to the global route reflector 100 that the routing path applies to a computing resource found within autonomous system number "65001" 22-1. The tagging 304:[1-5] of the advertised iBGP routing paths takes place at all five of the exemplary non-migrated regions 30:[1-5] that are being prepared for migration.

At the same time, all of the regional route reflectors 80:[1-5] are instructed to deny or filter 302:[1-5] out any path received at the global route reflector 100 that is from one of the regions 30:[1-5] to be migrated. For example, regional route reflector 80-1 filters out any routing paths received from any of the regions 30 being migrated with the tag mask "[BG AS:6500X]" which matches any of the regions 30 being migrated.

The global route reflector 100 inbound filtering 302 prevents a more specific BGP route next hop change which would result in a less optional route to the next hop. The filtering 300 of routing paths is enabled through the use of community tags.

A community tag, also known as a BGP community, is a mechanism used in BGP to tag or label routes with specific attributes. The community tag allows for grouping or classifying routes based on certain criteria, allowing network operators to apply policies and control the behavior of those routes. A community tag is a numeric or alphanumeric value attached to BGP updates and carried within the BGP community attribute. The community attribute is an optional, transitive attribute in BGP that can be added or modified by routers as the route propagates through the network. The community tag can represent various attributes or characteristics of a route, such as geographic location, customer type, service level, routing preference, or any other relevant classification. It provides a means for network administrators to categorize and manipulate routes based on their defined policies. Once a route is tagged with a community tag, routers within the network can use these tags to apply specific routing policies. For example, a network operator can configure routers to treat routes with a particular community tag differently, applying traffic engineering rules, filtering rules, or routing preferences based on the defined community tags. BGP communities are widely used in internet service provider (ISP) networks and large-scale networks to implement various routing policies and control the flow of traffic. BGP communities provide a flexible mechanism for routing control and allow network operators to customize the behavior of their network based on specific requirements.

Using community tags to assign attributes is preferred herein because some BGP table network-assigned attributes are transitive, and some are not. That is, BGP attributes do not change (i.e. transitive) as BGP attributes are learned when advertised to other External BGP AS Domains, while some are not (i.e. non-transitive). Community tags are transitive. Therefore, the communities tagged to networks will remain intact and assigned to those learned networks as all the external BGP AS Domains are migrated into a single BGP AS domain. The local preference attribute could possibly work as well but is not transitive. The metric attribute is also not transitive between External BGP AS Domains. BGP AS path length will change as networks are migrated, and although transitive, the BGP AS path length changes during the migration. Community tagging and filtering on the communities resulted in the best BGP Migration Optimization technique.

With the global route reflector 100, iBGP 50:[1-5] peerings, next hop instructions 306 and community tag filtering 300 now in place, the multi-region network 32 is ready for the next step in migration from a multi-region eBGP network to a single region iBGP network.

Figure 4:
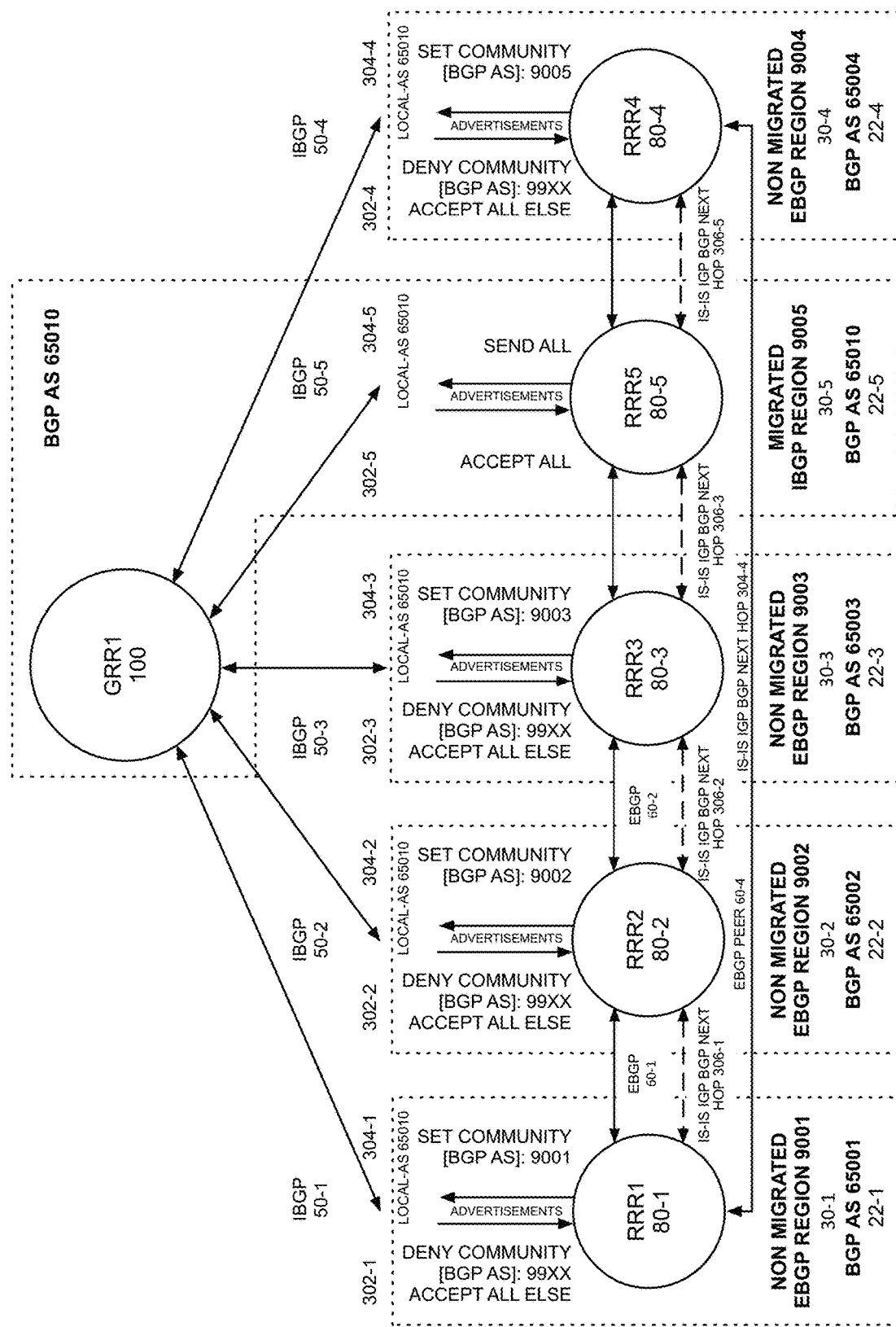
FIG. 4 is a conceptual illustration of the exemplary multi-region network including multiple autonomous systems connected using eBGP of FIG. 3 where a first region has been migrated in the migration to the single autonomous system using iBGP, according to one or more embodiments.

FIG. 4 is a conceptual illustration of the exemplary multi-region network including multiple autonomous systems connected using eBGP of FIG. 3 where a first region has been migrated in the migration to the single autonomous system using iBGP, according to one or more embodiments.

In migrating from FIG. 3 to FIG. 4, the migration module 6 performs the steps of identifying the region to be migrated, performing verification of pre migration setup, removing routing path filtering between a regional route reflector 80 and global route reflector 100, removing eBGP peering between the migrated region and other regions in the multi-region network, and adjusting autonomous system 20 numbering for the migrated region.

The identification of the region 30 to be migrated can be performed through inputs received by an administrator 2 or by programmatic means, such as through a script or the like and includes identifying the region 30 from the plurality of regions comprising the multi-region network 32.

The verification of the pre migration setup, which includes verifying networks in the autonomous system 20 identified for migration, verifying routing paths for the autonomous system 20 identified for migration, and verifying that the routing instructions are correct and optimal.

Reviewing all routing paths for the region 30 identified for migration includes reviewing all the routing paths and verifying the contents of the BGP routing tables at the other regions 30 in the multi-region network 32 to verify that the contents of those tables match the contents of BGP routing table of the region 30 identified for migration. This verification ensures that when the identified migration is made active, and eBGP peers are removed, the non-migrated regions 30:[1-3,4] will still be able to reach the migrated region 30:[5].

Verifying that the routing paths are correct and optimal includes collecting diagnostics by using the traceroute command from various other (i.e. not the region identified for migration) regions 30 in the multi-region network 32. Traceroute is a network diagnostic tool used to trace the path that data packets take from your computer or device to a destination on the Internet 10, such as a website or server. It provides information about each "hop" or intermediate network node that the packets traverse, helping identify any delays or issues along the route. Traceroute works by sending a series of packets with increasing time-to-live (TTL) values, allowing it to map the network path by receiving ICMP (Internet Control Message Protocol) Time Exceeded messages from each hop.

The removal of routing path filtering between the regional route reflector 80 and global route reflector 100 includes removing the unique identifier (community tag) from routing instructions advertised to the global route reflector 100 from the regional route reflector 80 and instructing the regional route reflector 80 to apply routing instructions received from the global route reflector 100 that are tagged with the unique identifier (community tag). The removal of routing path filtering between the regional route reflector 80 and global route reflector 100 is accomplished by updating the configuration of the regional route reflector 80 of the region identified for migration.

Once the tag filtering has been removed, the eBGP peering between the migrated region and other regions in the multi-region network 32 is removed. It is important to note that the removal of eBGP peering between the migrated region and other regions in the multi-region network 32 must be performed after the removal of routing path filtering between the regional route reflector 80 and global route reflector 100. Otherwise, routing loops and loss of reachability can occur.

Adjusting autonomous system numbering for the migrated region 30-5 includes migrating all regional route reflector clients to the new 65010 autonomous system and applying the local-as attribute on the regional route reflector 80 of the migrated region 30-5 to each regional route reflector client. A regional route reflector client is a router within the same autonomous system 20 as the regional route reflector 80 to which the regional route reflector client provides and receives routing paths. Adjusting autonomous system numbering also includes converting the migrated regional route reflector 80-5 autonomous system number 22 to match the autonomous system number 22 of the autonomous system 20 into which the migrated region 30-5 is being absorbed as well as removing the local-as attribute for the migrated regional route reflector 80-5.

Figure 5:
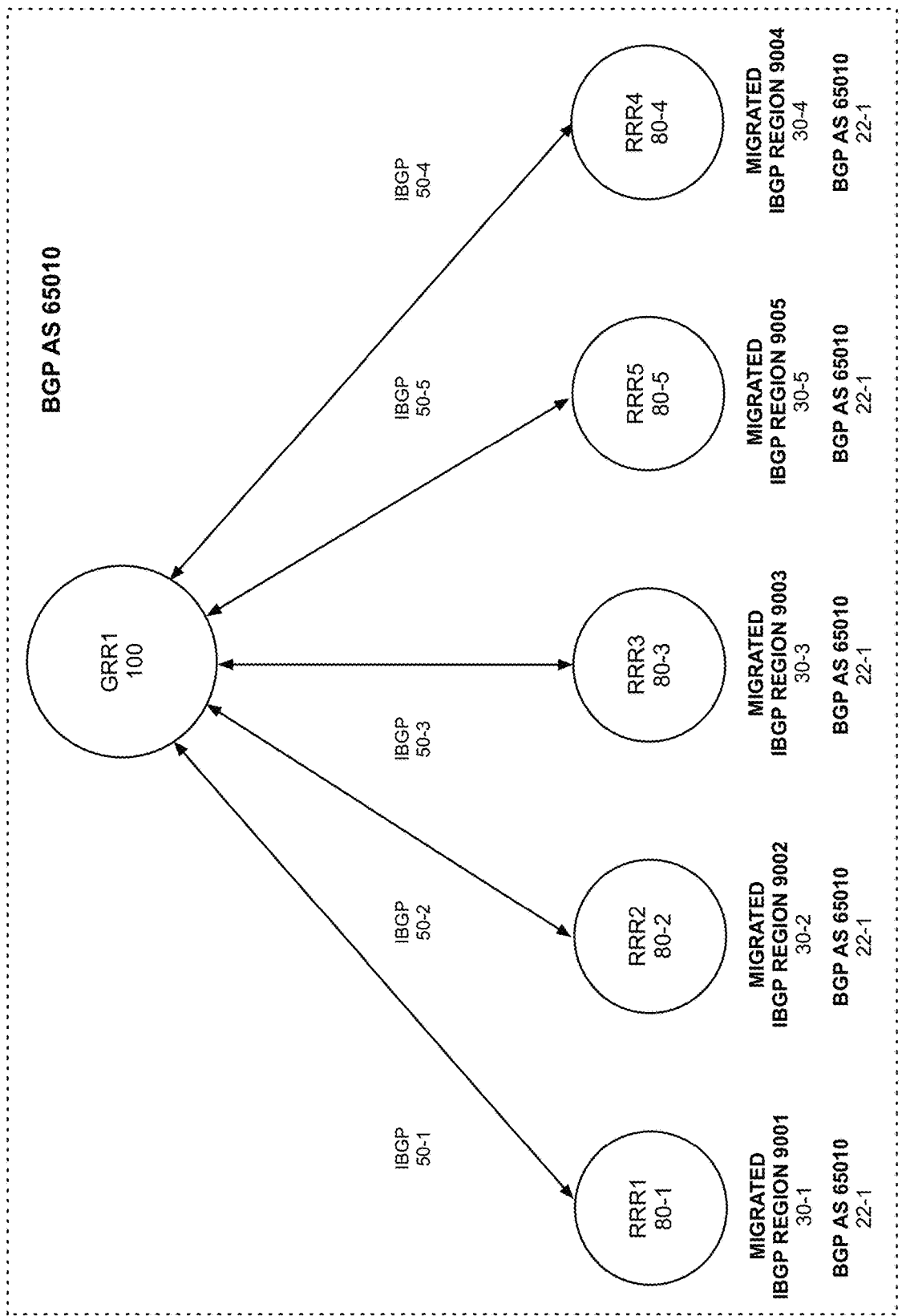
FIG. 5 is a conceptual illustration of the exemplary multi-region network including multiple autonomous systems connected using eBGP of FIG. 4 where all regions have been migrated to the single autonomous system using iBGP, according to one or more embodiments.

FIG. 5 is a conceptual illustration of the exemplary multi-region network including multiple autonomous systems connected using eBGP of FIG. 4 where all regions have been migrated to the single autonomous system using iBGP, according to one or more embodiments.

In migrating from FIG. 4 to FIG. 5, the migration module 6 iterates through the remaining non-migrated regions of FIG. 4 performing the steps outlined in the description of FIG. 4 until all regions 30 of the multi-region network 32 have been migrated from using eBGP 60 for routing between regions 30 to the topology shown in FIG. 5 where all the regions 30 use iBGP 50 to advertise and receive routing paths. Once all regions 30 have been migrated, no eBGP 60 peering remains between the regions 30, the local-as attributes are removed for all regions 30, and the regions all belong to the same autonomous system 20 with a single autonomous system number 22.

Figure 6:
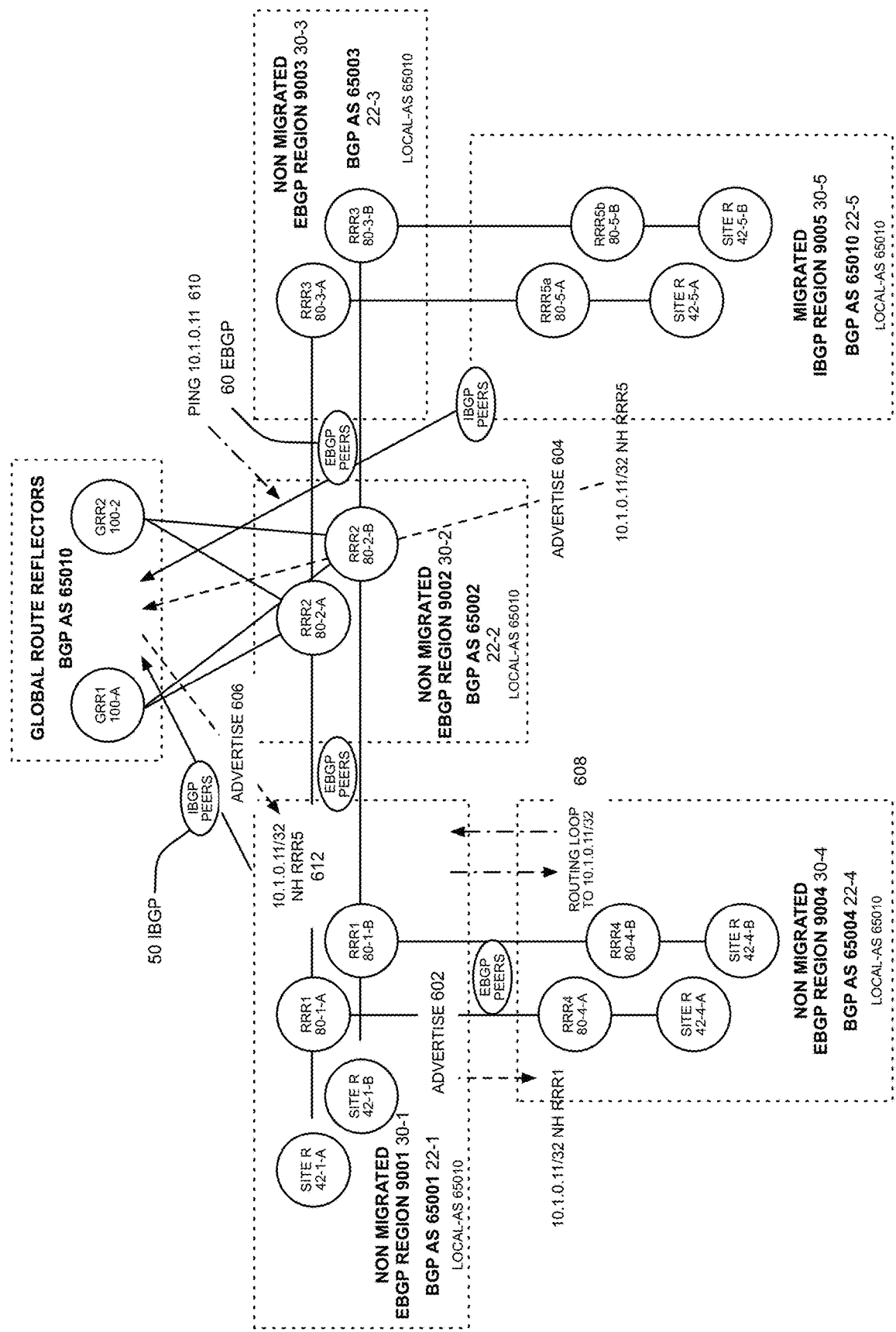
FIG. 6 is an alternative conceptual illustration of the exemplary multi-region network of FIG. 4 illustrating the importance of the order of the migration steps in preventing routing failures, according to one or more embodiments.

FIG. 6 is an alternative conceptual illustration of the exemplary multi-region network of FIG. 4, illustrating the importance of the order of the migration steps in preventing routing failures according to one or more embodiments. Unlike FIG. 4, FIG. 6 illustrates the use of redundancy in the routing infrastructure by providing backup systems for each of the routing infrastructure elements. The advertisement 602 of BGP route of "10.1.0.11/32 NH RRR5" 612 from regional route reflector one 80-1 to regional route reflector four 80-4 changes next hop to "10.1.0.11/32 NH RRR1" when advertised 604 from regional route reflector five 80-5 to regional route reflector one 80-1 through an advertisement 606 from the global route reflector 100. Regional route reflector two 80-2 knows that the next hop for "10.1.0.11/ 32" is at regional route reflector five 80-5 in the BGP NEXT HOP 306, and it learns from iBGP 50 peer routers that the global route reflectors 100 next hop in BGP NEXT HOP 306 is to regional route reflector four 80-4 to reach regional route reflector five 80-5. As a result, "10.1.0.11/32" becomes unreachable from regional route reflector two 80-2 due to the resulting routing loop 610.

The disclosed IBGPMO filtering will not resolve this issue. The filters 300 set a community (via tagging) on routes advertised from migrated regions 30:[1-3,5]. Once a region is migrated, such as region 30-5, the filtering 300 is removed. As a result, there is no community set (via tagging) on regional route reflector five 80-5 so regional route reflector one 80-1 accepts and uses the advertised routes. Regional route reflector one 80-1 then advertises 602 the routes via eBGP 60 to regional route reflector four 80-4. To prevent this problem, the community tag is removed from routing instructions advertised to the global route reflector 100 from the regional route reflectors 80 and the regional route reflector 80 is instructed to apply routing instructions received from the global route reflector 100 that are tagged with the community tag before removing any eBGP 60 peering.

FIG. 7A is an exemplary first part of a configuration file for configuring a regional route reflector for migration, according to one or more embodiments. FIG. 7A convers includes configuration instructions for regional route reflectors one and regional route reflectors two. FIG. 7B is an exemplary second part of a configuration file for configuring a regional route reflector for migration, according to one or more embodiments. FIG. 7B picks up where FIG. 7A leaves off. FIG. 7B covers includes configuration instructions for regional route reflectors three and regional route reflectors four. FIG. 7C is an exemplary third part of a configuration file for configuring a regional route reflector for migration, according to one or more embodiments. FIG. 7C picks up where FIG. 7B leaves off. FIG. 7C covers includes configuration instructions for regional route reflectors three and regional route reflectors five.

FIGS. 7A through 7C taken together form the configuration file for exemplary iBGPMO filter configurations for Cisco® IOS-XR Operating System Software routers for the multi-region network 32 shown in FIG. 1 (as well as FIGS.

2 and 3). The Cisco IOS-XR is an operating system software used by Cisco Systems for their high-end routers and networking devices. It is specifically designed for large-scale, carrier-grade network infrastructures and supports advanced features and capabilities required by service providers and large enterprises and is representative of high-end routers and the configuration required to perform the IBGPMO technique. However, the disclosed techniques are not limited hereto. Other routers will have comparable mechanisms for specifying the configuration needed for iBGPMO filter configuration and fall within the scope of the disclosed techniques. The configuration file includes five stanzas 701-705, one each for the five regions in the multi-region network 32.

Each stanza includes comments, such as comment 701-1 identifying the regional route reflector 80 to which the stanza applies and comment 701-2 identifying the community value (or tag) assigned to region one of the multi-region network 32. In this case, the regional route reflector 80 is identified as regional route reflector one 80-1 and the community tag for region one is "65010:9901" 701-4. The 9901 number in the community references the source region the route is located in and advertised from. The format is (2) 9's and XX represents the region number. The 65010 number identifies the autonomous system number of the global route reflector 100.

Each stanza also includes three declaration statements. Declaration statement 701-6 identifies a mask that can be applied to identify routes that are tagged as being in the multi-region network 32 which is being migrated. Declaration statement 701-8 identifies the routing policy for routes advertised from the regional route reflector one 80-1 to the global route reflector 100. Declaration statement 701-10 identifies the routing policy for routes advertised from the regional route reflector one 80-1 to the global route reflector 100. Stanzas 702 through 705 follow the same format as stanza 701.

Process Overview

Figure 8:
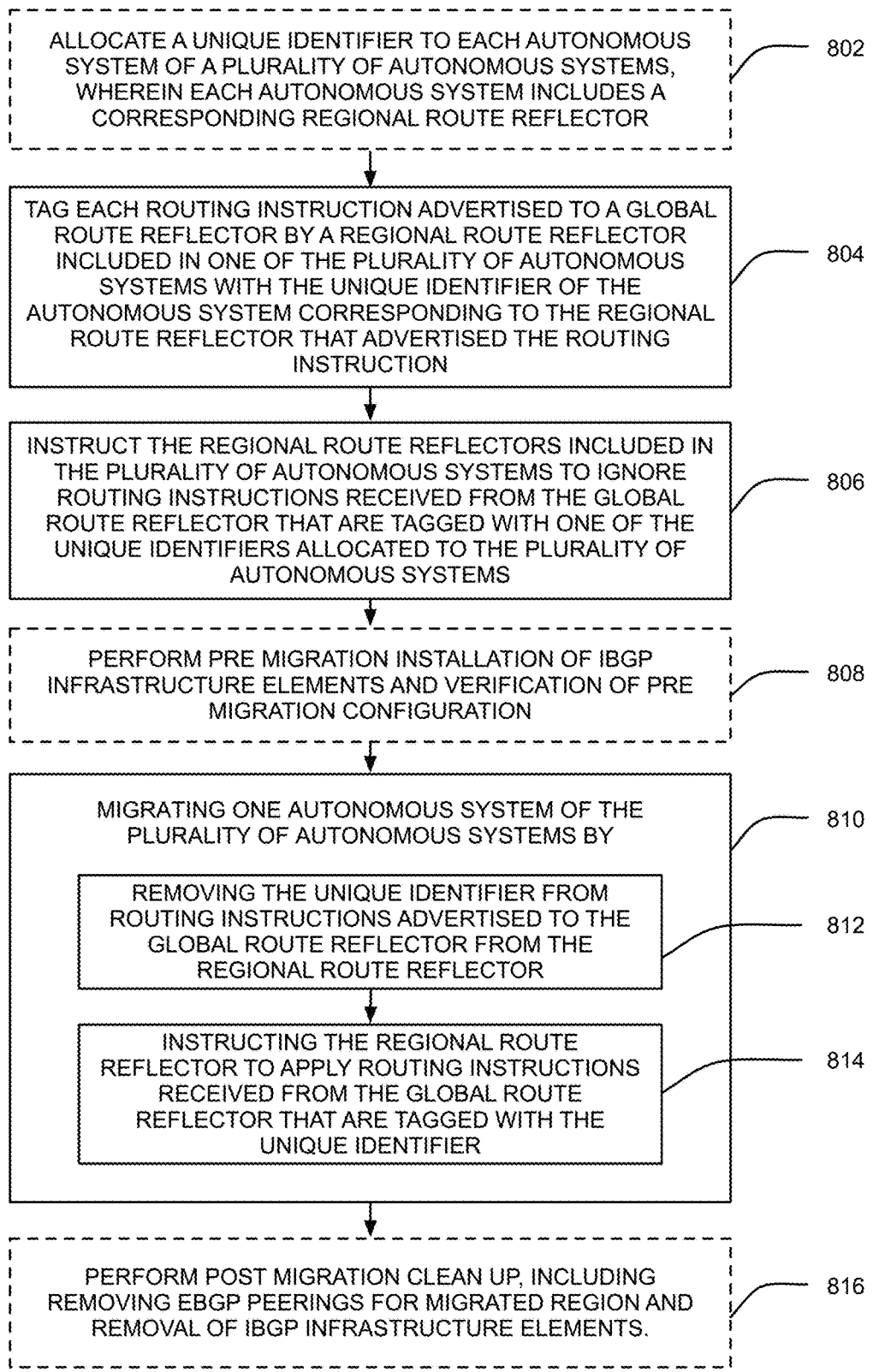
FIG. 8 is a conceptual illustration of flowchart showing the steps of the Internal BGP Migration Optimization (IBGPMO) Technique, according to one or more embodiments.

FIG. 8 is a flow diagram of method steps for migrating a multi-region network 32 including multiple autonomous systems 20 into a single autonomous system 20, according to one or more embodiments. In some embodiments, the multi-region network 32 to be migrated includes multiple autonomous systems connected using eBGP and after migration, the single autonomous system is connected using IBGP. Although the method steps are described in conjunction with the systems of FIGS. 1-7, persons of ordinary skill in the art will understand that any system configured to perform the method steps, in any order except where expressly prohibited, is within the scope of the present disclosure.

As shown in FIG. 8, method 800 begins at step 802, where in preparation for migration, a migration module 6 performs an allocation of a unique identifier to each autonomous system 20 of a plurality of autonomous systems 20, where each of the autonomous systems 20 includes a corresponding regional route reflector 80. The unique identifier can take the form of a community tag.

At step 804, the migration module 6 tags each routing instruction advertised to a global route reflector 100 by a regional route reflector 80 included in one of the plurality of autonomous systems 20 with the unique identifier of the autonomous system 20 corresponding to the regional route reflector 80 that advertised the routing instruction. Prior to a first migration, the routing instructions being advertised to the global route reflector 100 from the regional route reflectors 80 are exclusively eBGP routes. During migration, the routes advertised to the global route reflector 100 from the regional route reflectors 80 will be a mix of iBGP routes and eBGP routes (migrated regions will send iBGP routes and non-migrated regions will continue to send eBGP routes). After all regions 30 have been migrated, the routing instructions being advertised to the global route reflector 100 from the regional route reflectors 80 will be exclusively iBGP routes.

At step 806, the migration module 6 instructs the regional route reflectors 80 included in the plurality of autonomous systems 20 to ignore routing instructions received from the global route reflector 100 that are tagged with one of the unique identifiers allocated to the plurality of autonomous systems 20. Prior to a first migration, the routing instructions being received from the global route reflector 100 at the regional route reflectors 80 are exclusively eBGP routes. During migration, the routes received from the global route reflector 100 at the regional route reflectors 80 will be a mix of iBGP routes and eBGP routes (migrated regions will send iBGP routes and non-migrated regions will continue to send eBGP routes). After all regions have been migrated, the routing instructions being received from the global route reflector 100 at the regional route reflectors 80 will be exclusively iBGP routes.

Steps 804 and 806 can also include the pre migration installation of iBGP infrastructure elements. The installation of iBGP infrastructure elements includes installing the global route reflector 100 and installing iBGP 50 peerings between the global route reflector 100 and each of the regional route reflectors 80. The installation of iBGP infrastructure elements also includes configuring next hop instructions 306 between the region to be migrated and the regional route reflectors 80 to which the region to be migrated is currently connected using eBGP 60 peering.

At optional step 808, the migration module 6 performs the steps of identifying the region to be migrated and performing verification of pre migration configuration. The verification of pre migration configuration includes verifying networks in the autonomous system 20 identified for migration, verifying routing paths for the autonomous system 20 identified for migration, and verifying that routing instructions are correct and optimal.

At step 810, the migration module 6 migrates an autonomous system 20 of the plurality of autonomous systems 20 by performing steps 812 and 814.

At step 812, the migration module 6 removes the unique identifier from routing instructions advertised to the global route reflector 100 from the regional route reflector 80. After removal of the unique identifier from routing instructions advertised to the global route reflector 100, the routing instructions advertised to the global route reflector 100 will now be received by all autonomous systems 20 regardless of whether they have undergone migration since the routing instructions are no longer tagged and filtering 300 will no longer filter the routing instructions out.

At step 814, the migration module 6 instructs the regional route reflector 80 to apply routing instructions received from the global route reflector 100 that are tagged with the unique identifier. After instructing the regional route reflector 80 to apply the routing instructions received from the global route reflector 100, the routing instructions received, regardless of whether they are tagged or not, are applied by the autonomous system 20 undergoing migration.

At optional step 816, the migration module 6 performs post migration clean up, including removing the eBGP 60 peerings for the migrated region, removing iBGP infrastructure elements, and adjusting autonomous system 20 numbering for the migrated region. The removal of the eBGP 60 peerings for the migrated region must occur only after step 808 has been completed or routing loops can occur. The removal of the iBGP infrastructure elements can occur on a per autonomous system 20 basis as each autonomous system 20 is migrated or can occur in a batch for all migrated autonomous system 20 once all migration is complete. Adjusting autonomous system 20 numbering for the migrated region 30-5 includes migrating all regional route reflector clients to the new autonomous system number 22 and applying the local-as attribute on the regional route reflector 80 of the migrated region 30 to each respective regional route reflector client.

In sum, techniques are disclosed that enable the migration of a multi-region network including multiple autonomous systems into a single autonomous system. In some embodiments, the multi-region network is migrated from multiple autonomous systems, each using eBGP routing, to a single autonomous system using iBGP routing. The techniques include preparing the multi-region network for migration by installing IBGP infrastructure elements on the existing multi-region network and performing verification of the pre migration configuration. The added IBGP infrastructure elements include a global route reflector and iBGP peerings between the regional route reflectors of the autonomous systems to be migrated and the global route reflector. The verification of the pre migration configuration includes verifying networks in the autonomous system identified for migration, verifying routing paths for the autonomous system identified for migration, and verifying that routing instructions are correct and optimal. With the IBGP infrastructure elements in place, a single region of the multi-region network is migrated using tag filtering by tagging each routing instruction advertised to a global route reflector. The routing instruction advertised to a global route reflector by a regional route reflector is included in one of the plurality of autonomous systems with the unique identifier of the autonomous system that corresponds to the regional route reflector that advertised the routing instruction and instructs the regional route reflectors included in the plurality of autonomous systems to ignore routing instructions received from the global route reflector that are tagged with one of the unique identifiers allocated to the plurality of autonomous systems. Once a single region has been migrated, a post migration clean up is performed by removing the eBGP peerings for the migrated region, removing the iBGP infrastructure elements, and adjusting autonomous system numbering for the migrated region. Removing the eBGP peerings for the migrated region must occur only after the tag filtering installation has been completed or routing loops can occur. The technique employed in migrating a single region is repeated to migrate each region of the multi-region network until the migration is complete.

At least one technical advantage of the disclosed techniques relative to the prior art is that the disclosed techniques provide a mechanism to safely migrate multiple autonomous systems using eBGP into a single autonomous system using iBGP. The multiple autonomous systems using eBGP can be spread out among many different geographies throughout the world and span many different time zones, better techniques that incur less risk are needed The disclosed techniques ensure that during migration all currently routed paths remain optimal and unchanged after migration. The disclosed techniques also ensure that no routing loops form as the migration progresses from site to site. The disclosed techniques further ensure that all site networks and resources remain reachable as the migration progresses from site to site. Finally, the disclosed mechanism offers a time window for the administrator to use tools to verify that all sites will retain access to the network resources belonging to the site targeted for migration before the migration of the targeted site begins. The technical advantages provide one or more technological advancements over prior art approaches.

In some embodiments, a method for migrating a multi-region network including multiple autonomous systems into a single autonomous system comprises: tagging each routing instruction advertised to a global route reflector by a regional route reflector included in one of a plurality of autonomous systems with a unique identifier of the autonomous system corresponding to the regional route reflector that advertised the routing instruction; instructing the regional route reflectors included in the plurality of autonomous systems to ignore routing instructions received from the global route reflector that are tagged with one of the unique identifiers allocated to the plurality of autonomous systems; and migrating one autonomous system of the plurality of autonomous systems by: removing the unique identifier from routing instructions advertised to the global route reflector from the regional route reflector; and instructing the regional route reflector to apply routing instructions received from the global route reflector that are tagged with the unique identifier.

The method of clause 1 wherein the multiple autonomous systems are connected using eBGP and after migration the single autonomous system is connected using iBGP.

3. The method of clauses 1 or 2 wherein the method further comprises: allocating a unique identifier to each autonomous system of a plurality of autonomous systems, wherein each of the autonomous systems includes a corresponding regional route reflector.

4. The method of clauses 1-3, wherein the unique identifier is a community tag.

5. The method of clauses 1-4, wherein preparation for migrating the one autonomous system of the plurality of autonomous systems further comprises: installing iBGP infrastructure elements in the multi-region network.

6. The method of clauses 1-5, wherein installing the iBGP infrastructure elements in the multi-region network comprises: configuring the global route reflector.

7. The method of clauses 1-6, wherein installing the iBGP infrastructure elements in the multi-region network comprises: connecting the global route reflector with each of the regional route reflectors included in the multi-region network using iBGP peering.

8. The method of clauses 1-7, wherein installing the iBGP infrastructure elements in the multi-region network comprises: configuring next-hop instructions between each of the autonomous systems in the multi-region network.

9. The method of clauses 1-8, wherein migrating the one autonomous system of the plurality of autonomous systems further comprises: receiving an identification of an autonomous system for migration.

10. The method of clauses 1-9, wherein migrating the one autonomous system of the plurality of autonomous systems further comprises: assigning the global route reflector an autonomous system number matching the autonomous system number of the autonomous system for migration.

11. In some embodiments, one or more non-transitory computer-readable media storing instructions that, when executed by one or more processors, cause the one or more processors to migrate a multi-region network including multiple autonomous systems into a single autonomous system by performing the steps of: tagging each routing instruction advertised to a global route reflector by a regional route reflector included in one of a plurality of autonomous systems with a unique identifier of the autonomous system corresponding to the regional route reflector that advertised the routing instruction; instructing the regional route reflectors included in the plurality of autonomous systems to ignore routing instructions received from the global route reflector that are tagged with one of the unique identifiers allocated to the plurality of autonomous systems; and migrating one autonomous system of the plurality of autonomous systems by: removing the unique identifier from routing instructions advertised to the global route reflector from the regional route reflector; and instructing the regional route reflector to apply routing instructions received from the global route reflector that are tagged with the unique identifier.

12. The one or more non-transitory computer-readable media of clause 11, wherein the multiple autonomous systems are connected using eBGP and after migration the single autonomous system is connected using iBGP.

13. The one or more non-transitory computer-readable media of clauses 11 or 12, wherein preparation for migrating the one autonomous system of the plurality of autonomous systems further comprises: installing iBGP infrastructure elements in the multi-region network.

14. The one or more non-transitory computer-readable media of clauses 11-13, wherein installing the iBGP infrastructure elements in the multi-region network comprises: configuring the global route reflector; and connecting the global route reflector with each of the regional route reflectors included in the multi-region network using iBGP peering.

15. The one or more non-transitory computer-readable media of clauses 11-14, further comprising: performing verification of a premigration configuration, the verification including one or more of: verifying networks in the autonomous system identified for migration, verifying routing paths for the autonomous system identified for migration, and verifying that routing instructions are correct and optimal.

16. The one or more non-transitory computer-readable media of clauses 11-15, wherein migrating the one autonomous system of the plurality of autonomous systems further comprises: removing eBGP peering between an autonomous system to be migrated and other non-migrated autonomous systems in the multi-region network after the migration.

17. The one or more non-transitory computer-readable media of clauses 11-16, wherein migrating another autonomous system of the plurality of autonomous systems comprises: assigning the another autonomous system of the plurality of autonomous systems an autonomous system number matching the autonomous system number of the global route reflector.

18. The one or more non-transitory computer-readable media of clauses 11-17, wherein, upon completion of migration of all the autonomous systems of the plurality of autonomous systems in the multi-region network, all the autonomous systems of the plurality of autonomous systems are assigned a same autonomous system number as an autonomous system number of the global route reflector.

19. The one or more non-transitory computer-readable media of clauses 11-18, wherein, upon completion of migration of all the autonomous systems of the plurality of autonomous systems in the multi-region network, all regional route reflector clients in all the autonomous systems of the multi-region network are assigned a same autonomous system number as an autonomous system number of the global route reflector.

20. In some embodiments, a system comprises: a memory storing a migration module; and a processor coupled to the memory that executes the migration module to perform the steps of: tagging each routing instruction advertised to a global route reflector by a regional route reflector included in one of a plurality of autonomous systems with a unique identifier of the autonomous system corresponding to the regional route reflector that advertised the routing instruction; instructing the regional route reflectors included in the plurality of autonomous systems to ignore routing instructions received from the global route reflector that are tagged with one of the unique identifiers allocated to the plurality of autonomous systems; and migrating one autonomous system of the plurality of autonomous systems by: removing the unique identifier from routing instructions advertised to the global route reflector from the regional route reflector; and instructing the regional route reflector to apply routing instructions received from the global route reflector that are tagged with the unique identifier.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for migrating a multi-region network including multiple autonomous systems into a single autonomous system, comprising the steps of:
    tagging each routing instruction advertised to a global route reflector by a regional route reflector included in one of a plurality of autonomous systems with a unique identifier of the autonomous system corresponding to the regional route reflector that advertised the routing instruction;
    instructing regional route reflectors included in the plurality of autonomous systems to ignore routing instructions received from the global route reflector that are tagged with one of a plurality of unique identifiers allocated to the plurality of autonomous systems; and
    migrating one autonomous system of the plurality of autonomous systems by:
        removing the unique identifier from routing instructions advertised to the global route reflector from the regional route reflector; and
        instructing the regional route reflector to apply routing instructions received from the global route reflector that are tagged with the unique identifier.

2. The method of claim 1, wherein the multiple autonomous systems are connected using eBGP and after migration the single autonomous system is connected using iBGP.

3. The method of claim 1 further comprising:
    allocating a corresponding unique identifier to each autonomous system of a plurality of autonomous systems, wherein each of the autonomous systems includes a corresponding regional route reflector.

4. The method of claim 1, wherein the unique identifier is a community tag.

5. The method of claim 1, wherein preparation for migrating the one autonomous system of the plurality of autonomous systems further comprises:
    installing iBGP infrastructure elements in the multi-region network.

6. The method of claim 5, wherein installing the iBGP infrastructure elements in the multi-region network comprises:
    configuring the global route reflector.

7. The method of claim 5, wherein installing the iBGP infrastructure elements in the multi-region network comprises:
    connecting the global route reflector with each of the regional route reflectors included in the multi-region network using iBGP peering.

8. The method of claim 5, wherein installing the iBGP infrastructure elements in the multi-region network comprises:
    configuring next-hop instructions between each of the autonomous systems in the multi-region network.

9. The method of claim 1, wherein migrating the one autonomous system of the plurality of autonomous systems further comprises:
    receiving an identification of an autonomous system for migration.

10. The method of claim 9, wherein migrating the one autonomous system of the plurality of autonomous systems further comprises:
    assigning the global route reflector an autonomous system number matching the autonomous system number of the autonomous system for migration.

11. One or more non-transitory computer-readable media storing instructions that, when executed by one or more processors, cause the one or more processors to migrate a multi-region network including multiple autonomous systems into a single autonomous system by performing the steps of:
    tagging each routing instruction advertised to a global route reflector by a regional route reflector included in one of a plurality of autonomous systems with a unique identifier of the autonomous system corresponding to the regional route reflector that advertised the routing instruction;
    instructing regional route reflectors included in the plurality of autonomous systems to ignore routing instructions received from the global route reflector that are tagged with one of a plurality of unique identifiers allocated to the plurality of autonomous systems; and
    migrating one autonomous system of the plurality of autonomous systems by:
        removing the unique identifier from routing instructions advertised to the global route reflector from the regional route reflector; and
        instructing the regional route reflector to apply routing instructions received from the global route reflector that are tagged with the unique identifier.

12. The one or more non-transitory computer-readable media of claim 11, wherein the multiple autonomous systems are connected using eBGP and after migration the single autonomous system is connected using iBGP.

13. The one or more non-transitory computer-readable media of claim 11, wherein preparation for migrating the one autonomous system of the plurality of autonomous systems further comprises:
   installing iBGP infrastructure elements in the multi-region network.

14. The one or more non-transitory computer-readable media of claim 13, wherein installing the iBGP infrastructure elements in the multi-region network comprises:
   configuring the global route reflector; and
   connecting the global route reflector with each of the regional route reflectors included in the multi-region network using iBGP peering.

15. The one or more non-transitory computer-readable media of claim 11, further comprising:
   performing verification of a premigration configuration, the verification including one or more of:
      verifying multi-region networks in the autonomous system identified for migration,
      verifying routing paths for the autonomous system identified for migration, and
      verifying that the routing instructions are correct and optimal.

16. The one or more non-transitory computer-readable media of claim 11, wherein migrating the one autonomous system of the plurality of autonomous systems further comprises:
   removing eBGP peering between an autonomous system to be migrated and other non-migrated autonomous systems in the multi-region network after the migration.

17. The one or more non-transitory computer-readable media of claim 11, wherein migrating another autonomous system of the plurality of autonomous systems comprises:
   assigning the another autonomous system of the plurality of autonomous systems an autonomous system number matching the autonomous system number of the global route reflector.

18. The one or more non-transitory computer-readable media of claim 11, wherein, upon completion of migration of all the autonomous systems of the plurality of autonomous systems in the multi-region network, all the autonomous systems of the plurality of autonomous systems are assigned a same autonomous system number as an autonomous system number of the global route reflector.

19. The one or more non-transitory computer-readable media of claim 11, wherein, upon completion of migration of all the autonomous systems of the plurality of autonomous systems in the multi-region network, all regional route reflector clients in all the autonomous systems of the multi-region network are assigned a same autonomous system number as an autonomous system number of the global route reflector.

20. A system comprising:
   a memory storing a migration module; and
   a processor coupled to the memory that executes the migration module to perform the steps of:
      tagging each routing instruction advertised to a global route reflector by a regional route reflector included in one of a plurality of autonomous systems with a unique identifier of the autonomous system corresponding to the regional route reflector that advertised the routing instruction;
      instructing regional route reflectors included in the plurality of autonomous systems to ignore routing instructions received from the global route reflector that are tagged with one of a plurality of unique identifiers allocated to the plurality of autonomous systems; and
      migrating one autonomous system of the plurality of autonomous systems by:
         removing the unique identifier from routing instructions advertised to the global route reflector from the regional route reflector; and
         instructing the regional route reflector to apply routing instructions received from the global route reflector that are tagged with the unique identifier.

* * * * *